US006650977B2

(12) United States Patent
Miller

(10) Patent No.: US 6,650,977 B2
(45) Date of Patent: Nov. 18, 2003

(54) AUTOMATED VEHICLE INSPECTION SYSTEM

(75) Inventor: Steven P. Miller, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 09/920,494

(22) Filed: Aug. 1, 2001

(65) Prior Publication Data

US 2003/0028296 A1 Feb. 6, 2003

(51) Int. Cl.⁷ .............................................. G01M 17/00
(52) U.S. Cl. ....................................................... 701/29
(58) Field of Search ............................... 701/29–35, 39, 701/43–44, 62–63, 70, 76, 92, 97; 340/425.5, 439

(56) References Cited

U.S. PATENT DOCUMENTS 6,115,653 A * 9/2000 Bergstrom et al. ............ 701/29
6,553,290 B1 * 4/2003 Pillar .......................... 701/33

OTHER PUBLICATIONS

US 2002/0110146 Thayer et al "system and method for managing wireless vehicular communications".*

* cited by examiner

Primary Examiner—Thu Nguyen
(74) Attorney, Agent, or Firm—Jeffrey P. Calfa; Dennis Kelly Sullivan; Susan L. Lukasik

(57) ABSTRACT

The invention integrates a general purpose computer with a controller area network to effect an inspection regimen through the controller area network. A convenient user interface, combining handheld instruments and convention displays and printers allows the driver to interact with the system. The computer provides storage for programs and processing power to implement test regimens in logical order relating to completion of the inspection.

8 Claims, 3 Drawing Sheets

AUTOMATED VEHICLE INSPECTION SYSTEM

BACKGROUND OF THE INVENTION

1. Field of the Invention

The present invention relates generally to commercial motor vehicles and more particularly to an automated vehicle inspection system providing the collection of selected data and prompting manual inspection and entry of other data to promote the generation of electronic inspection reports in an efficient and complete manner.

2. Description of the Problem

Commercial transport regulations provide for periodic inspection of, generation of inspection reports relating to, and documentation of maintenance on, commercial vehicles. Inspections include checking numerous operational aspects of the vehicle for conformity to normative operational standards, implementing a check off system for maintenance when indicated by inspection, as well as for scheduled maintenance, and validating the reports generated and keeping copies of the reports for a minimum time period.

Vehicle interactive on board computers (OBC) have been suggested in the art for use in implementing inspection programs directed to meeting regulations. The OBC suggested in U.S. Pat. No. 5,680,328 was preferably a personal or lap top computer, which is used for receiving data inputs from a driver or maintenance personnel as part of an inspection, and for providing for the collection of data from various sensors placed on the vehicle. However, the '328 patent did not describe a mechanism for actually collecting data from vehicle sensors. The OBC may electronically store inspection reports, and provide copies of the same on a display or in hard copy form.

Contemporary designs for the control and management of vehicle components increasingly rely on methods derived from computer networking. Digital data is exchanged between component controllers over a common physical layer such as a twisted shielded pair of wires. Intelligible communication between two or more device controllers among a greater plurality of devices, all occurring over the common physical layer, depends upon the communicating devices being able to discriminate among messages they receive and to respond to those messages directed to them. Such methods are well known in the art and are part of the standards which the Society of Automotive Engineers (SAE) has published and continues to publish as part of the SAE J1939 protocol.

The J1939 protocol provides an open protocol and a definition of the performance requirements of the medium of the physical layer, but also allows for development of proprietary protocols. The SAE J1939 protocol is a specialized application of a controlled area network (CAN) and may be readily implemented utilizing commercial integrated circuits such as the C167 Integrated Circuit from Siemens of Germany.

The CAN protocol is an ISO standard (ISO 11898) for serial data communication, particularly aimed at automotive applications. The CAN standard includes a physical layer (including the data bus) and a data-link layer, which define useful message types, arbitration rules for bus access and methods for fault detection and fault confinement. The physical layer uses differential transmission on a twisted pair wire bus. A non-destructive bitwise arbitration is used to control access to the bus. Messages are small, at most eight bytes, and are protected by checksum error detection. There is no explicit address in the messages, instead, each message carries a numeric value which controls its priority on the bus, and may also serve as an identification of the contents of the message. CAN offers an error handling scheme that results in retransmitted messages when they are not properly received. CAN also provides means for removing faulty nodes from the bus. CAN further adds the capability of supporting what are termed "higher layer protocols" for standardizing startup procedures including bit rate setting, distributing addresses among participating nodes or kinds of messages, determining the layout of the messages and routines for error handling on the system level.

Digital data communications over serial data paths are an effective technique for reducing the number of dedicated communication paths between the numerous switches, sensors, devices and gauges installed on the vehicles. Multiplexing the signals to and from local controllers and switches promises greater physical simplicity through displacing much of the vehicle wiring harness, reducing manufacturing costs, facilitating vehicle electrical load management, and enhancing system reliability.

It would be desirable to add intelligence to a vehicle controller area network conforming to the SAE J1939 standard to implement inspection regimens.

SUMMARY OF THE INVENTION

The invention integrates a general purpose computer with a controller area network to effect an inspection regimen through the controller area network. A convenient user interface is based on a combination of one or more devices, including handheld instruments, conventional displays, keypads, pucks and printers, and allows the driver to interact with the system. The computer provides storage for programs and processing power to implement test regimens in a logical order relating to completion of the inspection. Full integration of an OBC to an individual vehicle inspection procedure to promote efficiency and completeness, and to avoid possible damage to the vehicle, aids organization of the tasks called for by the inspection.

The substantially automated inspection system of the present invention works with a vehicle having an engine and with various vehicle systems, characterized by measurable operating variables. The system includes an electrical system controller, a data communications bus connected at one node to the electrical system controller, a plurality of sensors connected to the data communications bus for transmitting data relating to the operating variables to the electrical system controller, an user input/output interface, an on board computer connected to the user input/output interface and to the data communications bus, the on board computer including memory, and a vehicle inspection regimen stored in the memory and executable on the on board computer. The program provides means for checking fluid levels against one or more limits for various vehicle systems before engine start, means for prompting an operator to start the engine if the operating fluid levels meet applicable limits, and means for completing the vehicle inspection regimen after an engine start.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
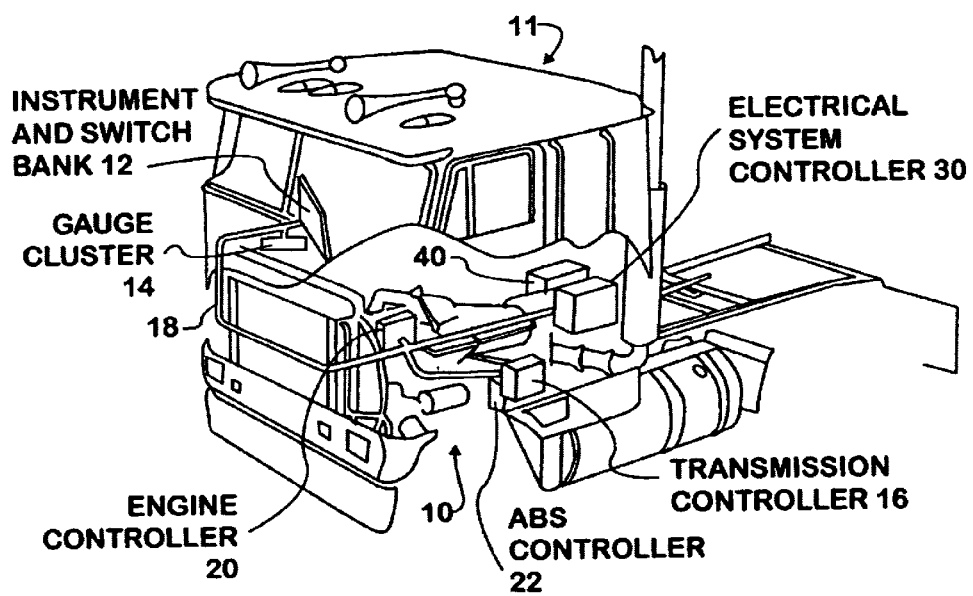
FIG. 1 is a partial cutaway view in perspective of a truck incorporating the invention.

FIG. 1 is a perspective view of a truck 11 and of an electrical control system 10 installed on the vehicle. Electrical control system 10 comprises a twisted pair (either shielded or unshielded) cable operating as a serial data bus 18. One node of bus 18 is an electrical system controller (ESC) 30, which is the central component of a vehicle electronic control system. ESC 30 manages a number of vocational controllers connected to bus 18 as nodes and positioned on truck II. Collectively, bus 18 and the various nodes attached thereto form a controller area network (CAN). Truck 11 includes conventional the conventional major systems of a vehicle, including an engine, a starter system for the engine, brakes, a transmission and running lights.

Active vehicle components are typically controlled by one of a group of autonomous, vocational controllers, which include a gauge cluster 14, an engine controller 20, a transmission controller 16, an auxiliary instrument and switch bank 12, and an antilock brake system (ABS) controller 22, all of which are nodes on serial data bus 18 allowing two way communication with ESC 30. Autonomous controllers include local data processing and programming and are typically supplied by the manufacturer of the controlled component. Bus 18 is a twisted pair cable constructed in accordance with SAE standard J1939. Although the autonomous controllers handle many functions locally and can function independently of ESC 30, they report data to ESC 30 and can receive operational requests from ESC 30.

An on board computer (OBC) 40 is also provided on truck cab 11. OBC 40 is based on a conventional personal or portable computer architecture and communicates with ESC 30, either over bus 18, or directly over a private bus. OBC 40 executes an inspection protocol leading to generation of required inspection and maintenance reports.

Figure 2:
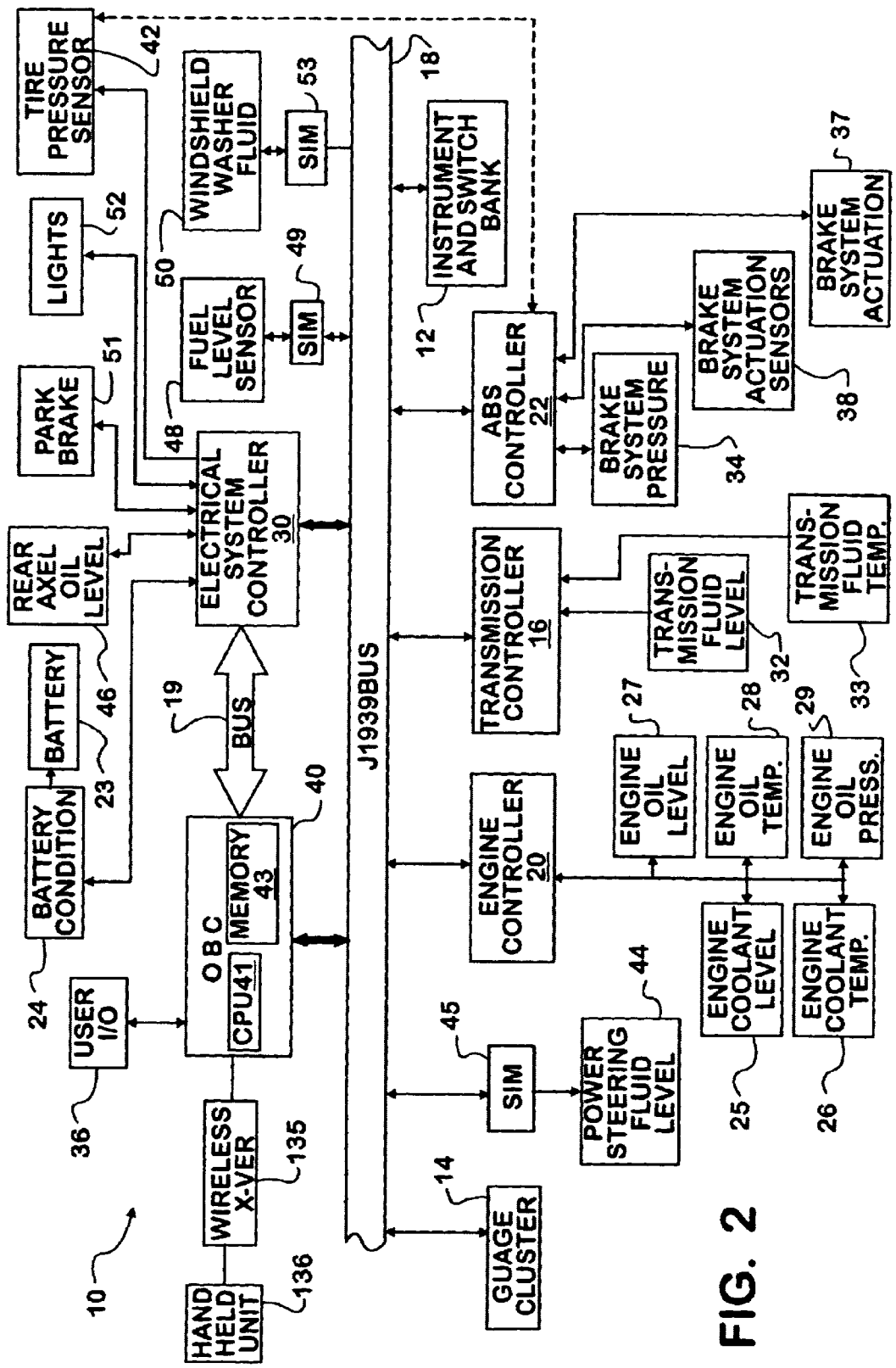
FIG. 2 is a block diagram of the electrical control system 10. ESC 30 can collect data from a variety of sources, both over serial data bus 18, or from sensors and devices directly connected to the ESC. One sensor illustrated as directly connected to a port on the ESC 30 is a rear axle fluid level sensor 46. Electrical system controller 30 also directly actuates lights 52 and can determine whether lights are working from the amount of current drawn. ESC 30 and OBC 40 may communicate over the serial data bus 18 or over a dedicated private bus 19. OBC 40 includes conventional memory 43 (both volatile and non-volatile) and program execution capacities (CPU 41).

FIG. 2 is a block diagram of the electrical control system 10. ESC 30 can collect data from a variety of sources, both over serial data bus 18, or from sensors and devices directly connected the ESC. One sensor is illustrated as directly connected to a port on the ESC 30 is a rear axle fluid level sensor 46. Electrical system controller 30 also directly actuates lights 52 and can determine whether lights are working from the amount of current drawn. ESC 30 and OBC 40 may communicate over the serial data bus 18 or over a dedicated private bus 19. OBC 40 includes conventional memory 43 (both volatile and non-volatile) and program execution capacities (CPU 41).

A serial data bus 18 conforming to the SAE J1939 standard provides for data communication between ESC 30 and an engine controller 20, a transmission controller 16, ABS controller 22, instrument and switch bank 12, a gauge cluster 14 and one or more sensor interface modules. These controllers and modules are in turn connected to one or more sensors which they collect data from and to which they may return data which relate to the sensors to ESC 30. The specific connections between sensors and nodes of the system is exemplary, and other arrangements than the one illustrated are possible.

Engine controller 20 is connected to an engine coolant level sensor 25, an engine coolant temperature sensor 26, an engine oil level sensor 27, an engine oil temperature sensor 28 and an engine oil pressure sensor 29. Engine coolant level sensor 25 is typically either a pressure or capacitive type sensor, and is located at a position in the coolant system allowing level sensing while the vehicle is stationary. The sensor has either a binary output (1=level acceptable, 0=add coolant), or an analog output indicating percentage full (50% to 120% full). The sensor has a maximum sample rate of 1 measurement per second. Measurements can be broadcast on bus 18 formatted in accordance with J1939 PGN65263. The engine coolant temperature sensor 26 is preferably located at a position in the engine coolant flow system allowing taking temperature readings during engine operation. This sensor has a range of −40° C. to 125° C., with a maximum sampling rate of 1 reading per second. Measurements can be taken after the engine has been running a minimum length of time. These measurements can be broadcast on bus 18 formatted in accordance with J1939 PGN 65262.

Engine oil level sensor 27 is either a capacitive or pressure type sensor, and is located at a position in the engine oil flow system allowing engine oil level sensing while the vehicle is level. Sensor 27 has either a binary output (1=level acceptable, 0=add oil), or an analog output indicating percentage full. If the output is analog, analog to digital conversion can be provided. Sensor 27 provides sampling at 2 Hz. Messages containing measurement data are transmitted over bus 18 in accordance with J1939 PGN 65263. Engine oil temperature sensor 28 is located in the oil flow system allowing measurements when the engine is running. Sensor 28 has a temperature operating range of −40° C. to 125° C., with a 1 Hz operating cycle. The message data format is J1939 PGN 65262. Engine oil pressure sensor 29 is located in the oil flow system to sample pressure during engine operation. Sensor 29 has an operating range of 0 psi to 200 psi with a sampling rate of 2 Hz. The message format is J1939 PGN 65263.

Transmission controller 16 is connected to a transmission fluid level sensor 32 and, usually, to a transmission fluid temperature sensor 33. Transmission fluid level sensor 32 is typically a capacitive or pressure type sensor, and is located in the transmission fluid flow system to obtain fluid level measurements when the vehicle is level and stationary. Sensor 32 may have an analog output (50% to 120% of full) or a logical binary output (1=level acceptable, 0=add fluid). The sampling rate is 1 Hz. The signal is routed to the transmission controller 16 and broadcast on bus 18 as a J1939 PGN 65272 signal. Transmission fluid sensor 33, while frequently connected to transmission controller 16, is sometimes directly connected to ESC 30. The sensor has an operating range of −40° C. to 125° C. and a 1 Hz sampling rate. Measurements, if routed through transmission controller 16, are formatted for data bus 18 as a J1939 PGN 65272.

The anti-lock brake system (ABS) controller 22 controls the brake system and is typically connected to brake system pressure sensors34 and brake actuation sensor 38, analysis of measurements from which allow determination of brake system functionality. OBC 40 will direct execution of an procedure to determine if the components of the vehicle brake system are functioning correctly. Brake system pressures are broadcast on bus 18 as a J1939 PGN 65274 signal. The OBC 40 can issue instructions to ESC 30, some for further transmission to the appropriate controller, to set and hold engine speed, to depress or pump the brakes (via brake system actuation 37) and for setting and releasing the parking brake 51. Alternatively, OBC 40 may prompt the driver/operator to carry out these tasks by the user I/O interface 36.

A power steering fluid level sensor 44 is located in a power steering fluid reservoir (not shown) and may be connected either to ESC 30, to engine controller 20, or, as illustrated here, to a sensor interface module (SIM) 45, which communicates with ESC 30 over bus 18. The sensor has either a binary output (1=level acceptable, 0=add fluid), or an analog output indicating percentage full (from 50% to 120%). The sensor sampling rate is 1 Hz. Transmission of the data is broadcast on bus 18 as a J1939 PGN 65272 message.

Fuel level sensors 48 are located in the vehicle's fuel tanks (not shown) and may be connected either to ESC 30, or, as illustrated here, to a SIM 53, which communicates with ESC 30 over bus 18. The sensor has an analog output indicating percentage full (from 0% to 100%). The sensor sampling rate is 1 Hz. SIM 53 provides analog to digital conversion of the sensor output and broadcast of a data message on bus 18 as a J1939 PGN 65276 message.

A windshield washer fluid level sensor 48 is located in a windshield washer fluid reservoir (not shown) and is typically connected to a SIM 49, which communicates with ESC 30 over bus 18. The sensor has a binary output (1=level acceptable, 0=add fluid). The sensor sampling rate is 1 Hz. Transmission of the data is broadcast on bus 18 as a J1939 PGN 65276 message.

Electrical system controller (ESC) 30 is represented as communicating directly with a number of devices. Such connections may be provided via ports which may be configured as power supply ports or serial data ports. Vehicle lights 52 are powered directly from ports on ESC 30. The operational integrity of vehicle lights 52 may be determined by current drawn. Other devices or sensors may similarly be directly connected to ESC 30, or they may be connected to bus 18 by a sensor or device interface module allowing data to be broadcast to ESC 30, or devices and sensors may be handled by one of the other autonomous controllers, such as engine controller 20. Rear axle oil level sensor 46 is connected either directly to ESC 30, or by a sensor interface module to bus 18. Sensor 46 may have either an analog output (50% to 120% of full), converted to digital data, or a binary output (1=level acceptable, 0=add oil). The maximum sampling rate is 1 Hz. The J1939 specification does not assign a message format for rear axle differential oil level, requiring a proprietary message format if transmission of data is handled by a SIM.

ESC 30 is connected to a battery condition sensor 24. Battery condition sensor 24 preferably represents a system comprising ammeters coupled to battery leads, battery voltage sensing and temperature sensors. The determination of battery capacity and charge entails execution of an algorithm and reference to battery performance and history tables. The complexity of the system may vary from application to application and the system may, in some circumstances, be different. This algorithm may be executed by OBC 30, which also provides for storage of a condition evaluation algorithm and the needed tables on memory 43. OBC provides a CPU 41 to execute the algorithm. Data relating to battery 23 is passed through ESC 30 from battery condition sensor 24.

ESC 30 is also connected to a tire pressure sensor 42. Tire pressure sensing may be provided for in a number of ways, including inferential pressure measurement based on relative tire rotational velocities (in which case measurements may be handled by the ABS controller 22), or by direct methods, such as battery powered sensors mounted in the tires, in which case the pressure measurements may be directly communicated by a connection between the sensors 42 and ESC 30. A gauge cluster 14 and an instrument and switch bank 12 communicate with ESC 30 over data bus 18. Additional components may be attached to bus 18 and accommodated by the inspection routine if deemed important, such a pump controller on a fuel tanker.

Driver inputs and prompts are handled by user I/O interface 36, which may be implemented in a touch screen display, conventional displays, and keyboards or pads. I/O interface 36 is under the direct control of OBC 40, accepts driver indication of task completions, including in cab and walk around inspection items, and further directs aspects of the brake inspection routine which cannot be economically automated. Driver acknowledgment of critical errors requiring immediate attention is provided. Prompts or buttons in interface 36 allow for this. OBC 40 can provide for storage of reports in memory 43, which includes volatile and non-volatile sections. Alternatively, the interface 36 may include a printer allowing hard copies of the reports to be printed. As described above, some aspects of the inspection procedure can require driver actions, such as pumping or depressing the brakes, which are prompted on I/O interface 36. For walk around portions of the inspection a wireless handheld unit 136 may by be used by the driver to receive prompts from OBC 40 via a wireless communication card 135.

Figure 3:
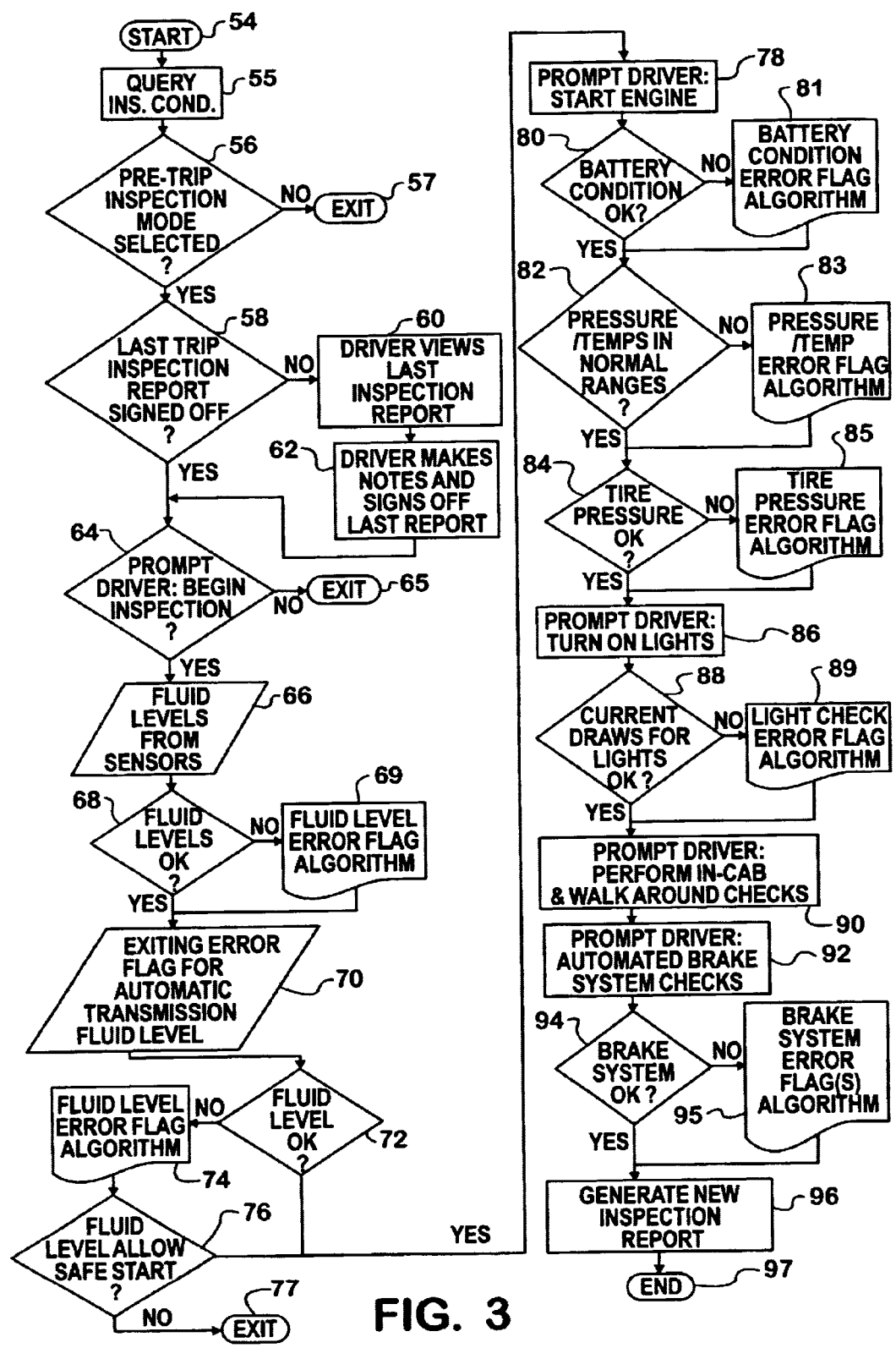
FIG. 3 is a flow chart illustrating the order of execution of the inspection program.

FIG. 3 is. a high level flow chart illustrating one possible procedure executed on OBC 30 to implement a preferred embodiment of the invention. The exemplary procedure begins with movement of the vehicle key to the on position from OFF (step 54). At step 56 it is determined if the pre-trip inspection mode has been triggered. These can occur at: (1) the request of the driver; (2) each time the key is moved from off to on; (3) each key on instance after a minimum time interval since the last key on instance; (4) each key on instance when the engine coolant temperature is below a minimum threshold; (5) each occasion of a change of driver; (6) a specific time of day; or (7) a minimum time interval since the last inspection. Particular triggering condition(s) are selected at the time when an OBC 30 is configured for a particular vehicle. The selections remain in effect until changed by the user/operator. Interrogation of the inspection triggering conditions is indicated by step 55. If none of the conditions is matched the routine is exited.

The routine has a pre-engine start segment (steps through step 76) and a post engine start segment (steps 78 to 97). If at step 56 an inspection is indicated, step 58 is executed to determine if the last inspection report, stored in memory 43, has been signed off. By "signed off" is usually taken as indication by a driver, possibly using a password or code, that an inspection was performed. Step 58 can also be used to force branching to step 60, for example in the case that it is simply desired to review the report. If not, the branch to step 60 is taken and the driver is prompted to review the last inspection report and to make notes and sign off on the report at step 62. Following verification of signing off on the previous report (the YES branch from step 58 or following step 62), inquiry is made by the I/O interface 36 to the driver as whether to begin the inspection (step 64). In not, for example in the situation where review of a prior report had been required, the program may be exited by step 65.

Following the YES branch from step 64 an inspection of the vehicle is begun. At step 66 all fluid level sensors are interrogated. Next, at step 68, the fluid level measurements are compared to minima criteria for acceptability. For each fluid level not meeting recommended levels step 69 is executed along the NO branch from step 68 to set a fluid level error flag. Upon analysis of all fluid levels processing is represented as progressing to a step 70 dealing with a default error flag for automatic transmission fluid level. Low transmission fluid level can result in catastrophic transmission damage and an engine start is not permitted unless transmission fluid level is confirmed to be above a minimum. If transmission fluid level is below the flag minimum another fluid level error flag algorithm is run (step 74) followed by determination as to whether the fluid level, even though below recommended minimums, is sufficient to allow a safe start (step 76). These steps occur only if the message relating to transmission fluid level is expressed in terms of percentage of full. If it is not, the routine is exited (step 77), otherwise, or following the YES branch from step 72, processing continues to step 78 and a prompt to the driver to start the engine.

Once the engine has been started battery condition may be updated. If battery condition is determined as unacceptable at step 80 a flag indicating the need for maintenance is set. Next the several pressure and temperature readings are compared to norms, and if any are out of norm, processing is temporarily interrupted (step 82) to set the appropriate flag (step 83). Then step 84 is executed to compare tire pressure measurements against minimum required levels. If a tire has inadequate pressure a flag is set (step 85). Following step 84 the driver is prompted to turn on the vehicle's lights (step 86). At step 88 the current drawn by the lights is compared with the minimum figure indicating that the lights are all working. If current draw is low a flag is set at step 89. Next the driver is prompted to perform in cab and walk around checks. A handheld display device may be used at this point. Step 92 represents execution of brake system checks, which may be automated or manual. Brake system is operation is compared with acceptable operating variables at step 94. If a variable is out of norm a brake system error flag is set using a sub process (represented by step 95). Finally, at step 96 a new inspection report is generated and the program is exited (step 97).

The present invention automates many applicable portions of a pre-trip inspection and provides immediate return information to the driver in the form of a electronic inspection report. This in turn saves both time and helps insure completeness of the reports.

While the invention is shown in only one of its forms, it is not thus limited but is susceptible to various changes and modifications without departing from the spirit and scope of the invention.

What is claimed is:

1. Apparatus for implementing an inspection system on a vehicle, comprising:

a controller area network installed on the vehicle;

a general purpose computer installed on the vehicle coupled for communication with the controller area network;

a plurality of sensors installed on the vehicle transmitting data over the controller area network;

means for routing the transmitted data to the general purpose computer;

programs executable on the general purpose computer far implementing an inspection protocol including the collection of data from the sensors and directing activities of a driver moving through and around the vehicle;

the inspection protocol providing preset triggering conditions particular to the vehicle for an operator to select initiating inspection of the vehicle, the operator can select one or more of the following triggering conditions: (1) request by the driver; (2) movement of an ignition key from an off to an on position; (3) movement of the ignition key from an off to an on position after a minimum time interval from a previous occurrence of movement of the ignition key from the off to the on position; (4) movement of the ignition key from off to on when an engine coolant temperature reading is below a minimum; (5) occasion of a change of driver of the vehicle: (6) a specific time day; and (7) a minimum time interval since the previous inspection; and a user interface for displaying results and instructions to the driver.

2. Apparatus as claimed in claim 1,the means for routing the transmitted data further comprising an electrical system controller.

3. Apparatus as claimed in claim 2, further comprising:

at least a first sensor connected to the electrical system controller;

a plurality autonomous controllers connected to the controller area network; and a plurality of additional sensors, each connected to one of the plurality of autonomous controllers.

4. Apparatus as claimed in claim 3, the inspection protocol further comprising a pre engine start segment and a post engine start segment.

5. Apparatus as claimed in claim 4, wherein the inspection protocol includes means for verifying that an indication has been entered by a user that a prior inspection was performed.

6. A vehicle, comprising:

a vehicle controller area network;

a plurality of autonomous local controllers relating to major vehicle systems connected to the vehicle controller area network;

an electrical system controller connected to the vehicle controller area network for managing the plurality of autonomous local controllers;

at least one sensor interface module connected to the vehicle controller area network;

a plurality of sensors, each connected to one of the plurality of autonomous local controllers, the electrical system controller, or the vehicle controller area network; and a computer coupled for communication with the electrical system controller for implementing inspection of vehicle operating conditions measured by the plurality of sensors through a program in response to occurrence of one of a plurality of preselected vehicle events, the computer being a stored program general purpose computer and including stored programs specifying an inspection protocol and at least one subsidiary program for implementing analysis of a vehicle system, the stored programs including means for evaluating a plurality of operator pre-selected inspection triggering conditions, an operator can pre-select any one or more of the following inspection triggering conditions: (1) request by the driver; (2) movement of an ignition key from an off to an on position; (3) movement of the ignition key from an off to an on position after a minimum time interval from a previous occurrence of movement of the ignition key from the off to the on position; (4) movement of the ignition key from off to on when an engine coolant temperature reading is below a minimum; (5) occasion of a change of driver of the vehicle; (6) a specific time day; and (7) a minimum time interval since the previous inspection.

7. The vehicle of claim 6, further comprising a user interface.

8. The vehicle of claim 7, wherein the stored programs provide for a two segment inspection protocol including a pre engine start segment and a post engine start segment.

* * * * *